No. 869,088. PATENTED OCT. 22, 1907.
D. HURST.
TROUGH.
APPLICATION FILED MAY 6, 1907.

Witnesses
Frank B. Hoffman
Wm. Bagger

Inventor
Daniel Hurst
By Victor J. Evans
Attorney

UNITED STATES PATENT OFFICE.

DANIEL HURST, OF RED OAK, IOWA.

TROUGH.

No. 869,088.　　　　　Specification of Letters Patent.　　　Patented Oct. 22, 1907.

Application filed May 6, 1907. Serial No. 372,018.

*To all whom it may concern:*

Be it known that I, DANIEL HURST, a citizen of the United States, residing at Red Oak, in the county of Montgomery and State of Iowa, have invented new and useful Improvements in Troughs, of which the following is a specification.

This invention relates to troughs for watering hogs and other stock; and it has for its object to provide a device of this class which shall prevent the larger and stronger animals from crowding the smaller and weaker ones, giving all an equal opportunity to drink.

Another object of the invention is to so construct the device as to prevent the animals from having access to the trough while the same is being filled, and to keep the contents clean and pure.

Still further objects are to simplify and improve the construction and operation of this class of devices.

With these and other ends in view which will readily appear as the nature of the invention is better understood, the same consists in the improved construction and novel arrangement and combination of parts which will be hereinafter fully described and particularly pointed out in the claims.

In the accompanying drawing has been illustrated a simple and preferred form of the invention; it being however understood that no limitation is necessarily made to the precise structural details therein exhibited, but that changes, alterations and modifications within the scope of the invention may be resorted to when desired.

Figure 1:
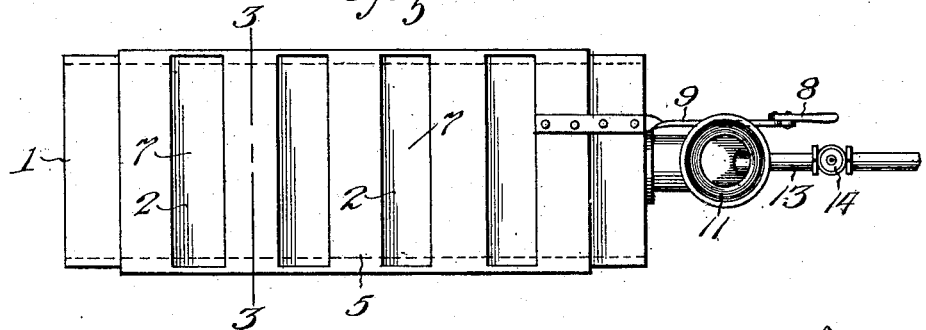
Figure 2:
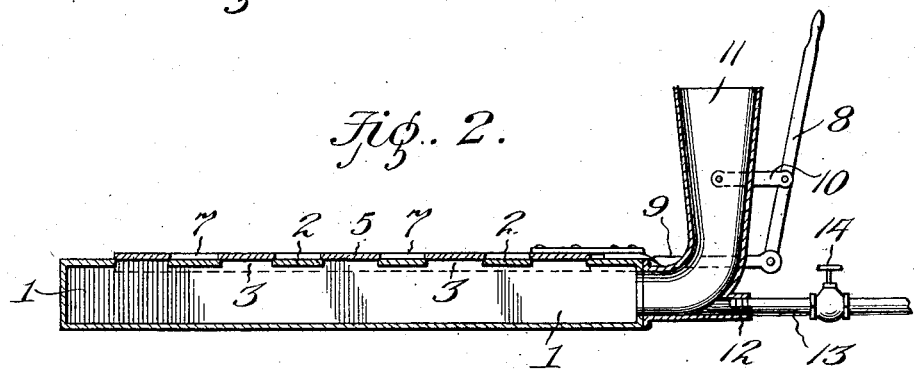
Figure 3:
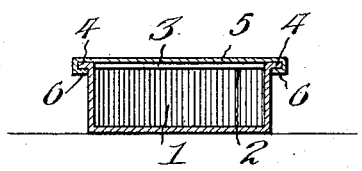
Figure 4:
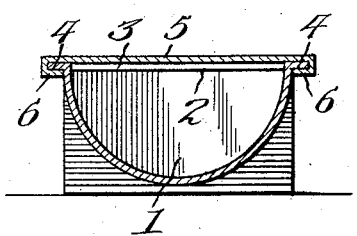
Figure 5:
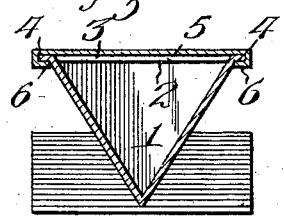

In the drawing: Figure 1 is a top plan view of a trough constructed in accordance with the invention. Fig. 2 is a longitudinal vertical sectional view of the same. Fig. 3 is a transverse section taken on the plane indicated by the line 3—3 in Fig. 1. Figs. 4 and 5 are transverse sectional views illustrating slight modifications in the construction of the trough.

Corresponding parts in the several figures are denoted by like characters of reference.

The improved trough 1 may be of any desired dimensions, and it may be of rectangular cross-section as shown in Figs. 1, 2 and 3; of semi-circular cross-section as shown in Fig. 4; of V-shaped cross-section as shown in Fig. 5; or it may be made of any one of a plurality of shapes which will readily suggest themselves, according to the circumstances under which it is to be used, the place where it is to be located, and other considerations.

The top of the trough is composed of a plurality of slats 2—2, suitably spaced apart to form intermediate openings or apertures 3—3 of proper dimensions. The upper edges of the trough are provided with longitudinally disposed flanges 4—4 affording guides for a longitudinally slidable cover 5 provided at the edges thereof with inturned flanges 6 operating upon the guide flanges 4; said cover being provided with a plurality of slots 7 adapted to register with the transversely disposed slats 2—2 forming the top of the trough. It will be readily seen that by moving or adjusting the cover 5 longitudinally of the trough, the slots 7 of the cover may be brought into or out of registry with the slots or apertures 3—3 between the slats 2—2, and that the width of the accessible openings may be thus regulated. The adjustment of the cover may be effected by means of a lever 8 which in the drawing has been shown as pivoted upon an arm 9 extending from one end of the cover; said lever being connected by means of a link 10 with a spout or hopper 11 extending upward at one end of the trough, and which constitutes an opening through which water, swill or other liquids may be introduced into the trough. In the drawings, the spout or hopper has been shown as a casting, suitably secured upon one end of the trough and having a laterally extending branch 12 into which is threaded a waste-pipe 13 which is provided with a suitable valve 14.

The operation of this invention and its advantages will be readily understood from the foregoing description taken in connection with the drawings hereto annexed.

By the use of this device, access to the trough and its contents may be cut off whenever desired, thus preventing interference by the animals while the trough is being filled. Owing to the presence of a larger number of feed apertures, and to the means whereby the sizes of said apertures may be regulated, the smaller and weaker animals will have an equal chance with the larger and stronger ones to feed or drink at the trough. The contents of the latter, when the trough is not in use, may be prevented from contamination by closing the feed apertures by means of the slidable cover; and the trough may be readily flushed and cleansed, when necessary, by means of the valved waste-pipe.

Having fully described the invention, what I claim is:—

1. An elongated feed trough having transverse slats separated by intervening spaces and longitudinally disposed laterally extending guide flanges, in combination with a slidable cover having inturned flanges engaging the guide flange and provided with transverse slots adapted for registry with the intervening spaces between the transverse slats of the trough.

2. An elongated trough having transverse slats and laterally extending guide flanges, a slidable cover engaging said flanges and having transverse slots, a feed spout or hopper at one end of the trough, an arm extending from the cover, a lever pivoted upon the arm, and a link connecting said lever with the hopper.

3. An elongated trough having transverse slats, a longitudinally slidable cover having transverse slots, a feed spout at one end of the trough, an operating lever operatively connected with the slidable cover, a link connecting the operating lever with the feed spout, and a valve waste pipe connected with the spout.

In testimony whereof, I affix my signature in presence of two witnesses.

DANIEL HURST.

Witnesses:
  C. J. NAUERK,
  E. S. ECKLEY.